(12) United States Patent
Schmitz et al.

(10) Patent No.: US 9,035,570 B2
(45) Date of Patent: May 19, 2015

(54) LED-AIRFIELD LIGHT

(71) Applicant: Hella KGaA Hueck & Co., Lippstadt (DE)

(72) Inventors: Klaus-Peter Schmitz, Lippstadt (DE); Bernhard Rupprath, Lippstadt (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 14/248,642

(22) Filed: Apr. 9, 2014

(65) Prior Publication Data

US 2014/0252982 A1    Sep. 11, 2014

Related U.S. Application Data

(63) Continuation of application No. PCT/EP2012/069628, filed on Oct. 4, 2012.

(30) Foreign Application Priority Data

Oct. 10, 2011    (EP) ..................................... 11184489

(51) Int. Cl.
   *H05B 33/08* (2006.01)
   *B64F 1/20* (2006.01)

(52) U.S. Cl.
   CPC .............. *H05B 33/0842* (2013.01); *B64F 1/20* (2013.01); *B64D 2203/00* (2013.01); *H05B 33/0854* (2013.01)

(58) Field of Classification Search
   CPC ...... B41J 2/45; B41J 2/04586; B41J 2202/20; B41J 2/04505; B41J 2/04508; B41J 2/0451; B41J 2/04528; B41J 2/04541; B41J 2/04543; B41J 2/04563; B41J 2/04573; B41J 2/17546; B41J 15/02; B41J 3/44

USPC .......................................................... 315/291
   See application file for complete search history.

(56) References Cited

U.S. PATENT DOCUMENTS

2008/0068312 A1    3/2008   Kim

FOREIGN PATENT DOCUMENTS

| CN | 1928972 | 3/2007 |
|----|---------|--------|
| CN | 101406109 | 4/2009 |
| CN | 102196630 | 9/2011 |
| EP | 1 696 707 A2 | 8/2006 |

(Continued)

OTHER PUBLICATIONS

Search Report and Written Opinion in PCT/EP2012/069628 mailed Oct. 31, 2012.
Extended European Search Report in EP Application No. 11184489.0 mailed Feb. 28, 2012.
Response to Feb. 28, 2012 Extended European Search Report in EP Application No. 11184489.0, filed Oct. 2, 2012.

(Continued)

*Primary Examiner* — Douglas W Owens
*Assistant Examiner* — Monica C King
(74) *Attorney, Agent, or Firm* — Norton Rose Fulbright US LLP

(57) ABSTRACT

A method for driving a LED-airfield light by a controller 18, being at least connected two LED-modules 20, 30, wherein the LED-modules 20, 30 each comprise a memory 28, 38, permits to drive the LEDs at equal luminosity if the method comprises at least the steps of storing status information about each LED-module 20 on the respective LED-module 20, reading the status information by the controller 18 and determining driving parameters for a first LED-module 20 of the at least two LED-modules 20, 30, considering the status information about at least one second LED-module 30.

10 Claims, 2 Drawing Sheets

(56) References Cited

FOREIGN PATENT DOCUMENTS

| EP | 1956869 | 8/2008 |
| EP | 1 696 711 A2 | 8/2011 |
| EP | 2 581 311 | 4/2013 |
| WO | WO/2007/006684 A1 | 1/2007 |
| WO | WO/2007/104137 A2 | 9/2007 |

OTHER PUBLICATIONS

European Examination Report in EP Application No. 11184489.0 mailed Oct. 26, 2012.

Response to Oct. 26, 2012 European Examination Report in EP Application No. 11184489.0, filed Feb. 13, 2013.

Notice of Intent to Grant in EP Application No. 11184489.0 mailed May 29, 2013.

LED-AIRFIELD LIGHT

PRIORITY CLAIM

This application is a continuation of pending International Application No. PCT/EP2012/069628 filed on 4 Oct. 2012, which designates the United States and claims priority from European Application No. 11184489.0 filed on Oct. 10, 2011 and granted as EP 2581311. The mention of the grant was published in European Patent Bulletin 13/50 of 11 Dec. 2013. The contents of both of these applications are incorporated by reference in their entireties.

BACKGROUND OF THE INVENTION

1. Field of the Invention

The invention relates to LED airfield lights, like runway lights or taxi-way lights. In particular, the invention relates to a LED airfield light with at least two lighting modules, which are preferably separately replaceable and a method for driving LEDs of the lighting modules.

2. Description of Relevant Art

In the present, LED airfield lights become more and more popular due to their high efficiency and low maintenance costs. Often LED airfield lights comprise two or more separately replaceable lighting modules.

WO99/54854 A2 discloses an airfield lighting system comprising multiple LED airfield lights. These airfield lights each comprise a microprocessor which is connected by a data bus to central control unit. The microprocessor controls the LEDs of the respective airfield light. The microcontroller, the LEDs, switching and control components are integrated in a module, which is separately replaceable.

WO 2009/112318 A1 discloses a lighting device with readable operating parameters. These operating parameters are provided to a controller, which buffers the operating parameters in a separate storage unit. The operating data can be accessed for an external analysis via an interface.

WO 01/45471 A1 discloses an arc lamp. Attached to the arc-lamp is a storage device for storing run time data of the arc lamp. This runtime data can be read by the manufacturer for defending a claim for free replacement, in case the arc-lamp was operated under conditions that did not comply with the arc-lamp's specification.

WO2007/104137A2 discloses a light unit being interchangeably connected to a lighting device with a controller for controlling the activation of one or more lighting elements. The lighting unit has a carrier onto which at least one lighting element and a memory are arranged. In the memory operational characteristics of the lighting element are stored. The controller reads the information from the memory and controls the lighting element according to the information, to thereby avoid a calibration after replacement of a lighting unit of the lighting device.

WO 2007/006684 A1 discloses a LED-traffic light having a light unit for emitting a light signal. The light unit comprises a controller for controlling and driving the LEDs. The controller is connected to a unit, which synchronizes signals being emitted by different light units. To better detect malfunctions of the LEDs the controller of the light unit is positioned in the proximity of the LEDs and not in the unit for synchronizing the signals.

EP 1 696 707 A2 discloses a lighting unit for alighting device. The lighting unit has lighting element, e.g. a LED, and a memory for providing information about the lighting element to a controller via a signaling line. The memory is included in the controller.

EP 1 696 711 A1 discloses a lighting device with a lighting element, a memory and a driver unit. The lighting device is configured for being included a network using the DALI-protocol (DALI means Digital Addressable Lighting Interface). For addressing the lighting devices in the network, a unique identifier of a driver unit of the lighting device is stored in the memory. Additional information, e.g. a type number may be encoded in the unique identifier or stored separately. The type number may be used for retrieving technical data from a data base and to control the lighting device accordingly.

The above summaries of the above referenced prior art include generalizations of the respective technical teachings that are not applicants admitted prior art, by rely on the applicants analysis of the respective documents.

SUMMARY OF THE INVENTION

LED airfield lights often comprise two or more lighting modules. A close matching of the emitted luminances is required by ICAO standards. The problem to be solved by the invention is to permit replacement of single lighting modules of LED airfield lights with two or more lighting modules and to ensure, that the lighting modules emit light with at least substantially equal luminance even if the LEDs on the module have a different age or are of different types. At the same time a replacement of a single lighting module should be simple and should not stress the components to thereby enhance reliability of the LED-airfield light.

The problem is solved by a method and a LED airfield light of the respective independent claims. The dependent claims relate to further improvements of the invention.

The LED-airfield light has a printed-circuit board carrying a controller for driving at least two LED-modules as light modules. The controller may comprise e.g. a microcontroller and a driver circuit, the latter being controlled by the microcontroller.

In one embodiment the LED-airfield light comprises at least a first and preferably a second LED-module. Each of the LED-modules may comprise at least one LED for lighting the airfield. Thus, on the first module is at least one first LED and on the second module is at least one second LED. The first and second LED-modules are preferably each electrically connected to the first printed-circuit board by a first and second cable, respectively. Thus there may be a first cable connecting the first LED-module with the printed-circuit board and a second cable for connecting the second LED-module with the printed-circuit board. Typically ribbon cables are used. At least one of the LED-modules may comprise a memory for storing status information about the respective LED(s). In a preferred embodiment a first memory for storing status information about the first LED is on the first LED-module and a second memory for storing status information about the second LED is on the second LED-module. This permits the controller to read the status information of the LEDs and drive the LEDs in accordance with the status information. If a LED-module is being replaced it may comprise a different type of LED. The information required for driving the replaced LED(s) may be comprised in the status information, permitting the controller to drive the LED in accordance with the LED's specification. The memory for storing status information about one or more LEDs of a LED-module is preferably part of the LED module and may thus be inserted or replaced together with the LED-module Preferably, the first and second status information is processed by the controller to identify a LED with a lower luminosity at some given driving parameters, e.g. some standard driving parameters or the current driving parameters, and a LED with a higher luminosity from the first and second LEDs. Subsequently the driving parameters of the LED with the higher luminosity are adapted to emit the lower luminosity. This enables to replace the modules independently and nevertheless make sure that the LED-modules emit at least substantially the same luminosity. In a further embodiment the luminosity of the lower luminosity LED can be increased by providing more power to the respective LED. This permits to compensate for the loss of luminosity due to aging effects. Although one should consider that driving an older LED, i.e. with lower luminosity, with driving parameters that result in the luminosity of the younger LED, may significantly decrease the lifetime of the older LED.

Preferably the first and/or second cable is connected by at least one connector to the first printed-circuit board and/or first and/or second LED-module, respectively. The term connector preferably means an electrical connector that may be plugged to a complementary mating counterpart. A very simple embodiment of such connector is for example commonly referred to as strip. This permits an easy replacement of the LED module by simply unplugging the old LED-module and plugging in of the new LED-module. The cable may have e.g. two signaling lines for connecting the memory with the printed-circuit board and thus with the controller. The signaling lines are each connected to a connecting pin of the connector. Preferably, the connecting pins to which the signaling lines are connected to are positioned symmetrically under a rotation of for example 180° C. of the connector. Thus, the connector connects in any case the signaling lines with each other, however a signaling line mismatch may occur. Such mismatch can be resolved by a permutation of the signaling lines by the controller or some other permutation means. This permits to ignore the orientation of the connector, but instead avoid in any case a crossover over torsion of the cable and thereby reduce the probability of failure of the cable. The cable may have additional power lines for providing power to the memory and/or at least one LED. These lines are preferably as well symmetric under a rotation of the connector. For example the cable may comprise at least two groups of power lines for example for powering at least one LED by each of the groups. Preferably the connecting pins to which the groups of power lines are connected to are positioned symmetrically under a rotation of the connector. Means, the two groups are "mapped" onto each other under a rotation of the connector, taking into account the polarity of the power lines. Each group may in the simplest case consist of two lines (+, −).

In a preferred embodiment at least one of the LED-modules comprises a printed-circuit board with a sheet metal layer. If a LED is mounted on such a printed-circuit board the heat dissipation from the LED is enhanced, permitting a higher luminosity at given LED-temperature and/or a reduction of LED temperature at a given luminosity, which yields a longer lifetime of the LED.

The temperature of the LED(s) is preferably monitored by a sensor element for measuring the LED's temperature. A sensor element may include an integrated sensor, a diode, a NTC (negative temperature coefficient resistor) or a PTC (positive temperature coefficient resistor) may be used. Such sensor element is preferably mounted on the first and/or second LED-module's sheet metal and may be connected directly to the controller and/or to the memory by analog or data bus lines.

In a preferred embodiment the memory is non volatile. Thus, the status information is kept without power supply. The memory may be an EEPROM.

Another embodiment of the invention relates to a method for operating an airfield light like the one described above, e.g. with at least one controller being at least connected two LED-modules, wherein the LED-modules each comprise a memory. The method may at least comprise the steps of storing status information about each LED-module on the respective LED-module, reading the status information by the controller, and determining driving parameters for a first LED-module of the at least two LED-modules, considering the status information about at least one other LED-module. If one replaces only one of e.g. two LED-modules, the LEDs on the replaced modules are new. The other LEDs, however are older and typically provide less light at a given power setting and temperature due to the LEDs degeneration. Thus, if the controller would drive the older and the younger LEDs with the same power, the younger LED-module would appear brighter. According to the invention, however, the younger module can be driven with less power, such that the LED-modules appear at least essentially equally bright. Alternatively one could enhance the power provided to the older LED-module, however, this may cause a reduction of its lifetime.

In a preferred embodiment the status information may comprise at least one of the values of the group formed by an emitted luminosity, a current, a voltage and a temperature and/or a value of use. This information permits to drive a LED with a predictable luminosity. If only one of these values is stored in the memory the other values define standard conditions under which the stored value is obtained. Thus the above values permit to parameterize a diode's characteristic.

In a preferred embodiment the status information comprises at least one value of use representing the degeneration of the LED on the respective LED-module due to its use. This permits to consider the reduced luminosity due to the degeneration of the LED ("aging"), when driving the LED e.g. to ensure that even LEDs with a different "age" appear equally bright: If for example the second lighting module is replaced due to some maintenance, the first LED has a higher power-on time, resulting in a lower luminosity as the second LED at some given driving parameters. The method permits to adapt the luminosity of the second LED to the luminosity of the first LED by taking into account the reduced luminosity of the first LED and thereby to provide the LED-modules with driving parameters resulting in at least essentially the same luminosity.

The value of use may comprise the power on time count of the LED on the respective LED-module. The power-on time count is easy to measure and to store but provides already a good estimation of the LEDs aging.

In preferred embodiment the power-on time count and the integrated current through the LED are comprised in the value of use.

In another embodiment the value of use comprises a function of $\int_{t_0}^{t} f(T(t'))dt'$, wherein $T(t')$ is the temperature of the respective LED or LED-module measured at some time $t'$ and $f(T(t'))$ a weighting function. $\int_{t_0}^{t} f(T(t'))dt'$, permits an even better estimation of the a LED's because the degeneration of a LED depends strongly on the temperature at which the LED is operated. This is accounted for by the weighting function. Thus a simple comparison of the value of use permits to identify lower and higher luminosity LEDs. A simple possibility of calculating the above integral can be obtained by storing power-on time counts for different temperature intervals, and summing the power-on time counts after multiplication with some factor, thereby taking into account the temperature dependence of the LEDs degeneration. The factor may be dependent on the respective temperature intervals and/or the current, because a power on time count at a higher operating temperature and/or current causes a faster generation than the same power on time at some lower temperature and/or current respectively.

Based on the value of use one may determine an expected luminosity of e.g. the lower luminosity LED at some given driving parameters. Such luminosity could be stored in a table. By a reverse look-up of the luminosity one can obtain the driving parameters for the higher luminosity LED.

If the controller is connected to at least one of the memories by at least two signaling lines it is preferred that the controller attempts to communicate with at least one of the memories and permutes the signaling lines if the communication with the memory chip fails. Subsequently the controller attempts to communicate again. Communication can typically be reading or storing information on the memory.

Only for convenience, the term "LED" may be understood as plural or singular, i.e. as "LEDs" or "LED", wherein LED is the acronym for "Light Emitting Diode".

BRIEF DESCRIPTION OF THE DRAWINGS

In the following, the invention will be described by way of example, without limitation of the general inventive concept, on examples of embodiment and with reference to the drawings.

Figure 1:
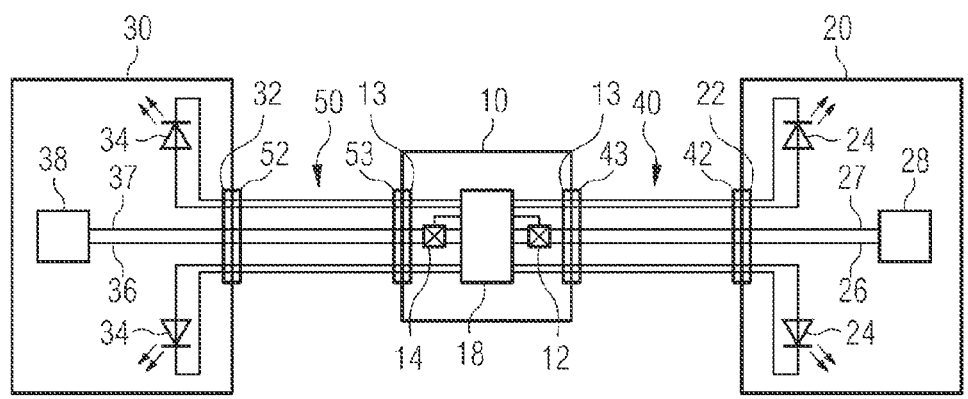
FIG. 1 shows a simplified circuit diagram of an airfield light.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1 a component 10 comprises a controller 18 for driving LEDs 24, 34. The component may e.g. be a printed circuit board. The controller 18 is connected by some connection means to a main control unit (not shown). The LEDs 24 are on a first LED-module 20 and the LEDs 34 are on a second LED module 30. On each of the LED-modules 20, 30 is a memory 28, 38 for storing status information of the LEDs 24, 34 on the respective module. The status information can e.g. be the power-on time count at different operating temperatures of the LEDs, their type, manufacturer, maximum current, luminosity as function of temperature coefficient, luminosity as function of value of use coefficient and the luminosity at some standard powers settings or any other parameter described herein.

The LED-modules 20, 30 are each connected by a ribbon cable 40, 50 to the printed-circuit board 10. The ribbon cables 40, 50 are connected to the printed-circuit board 10 and the LED-modules 20, 30 by complementary connectors 42, 22, 13, 43, 32, 52, 53. The memories 28, 38 are connected to the controller 18 by signaling lines 26, 27 and 36,37, respectively. Between the controller 18 and the memories 28, 38 are crossover switches 12, 14 for switching the signaling lines 26, 27. The connector pin assignment of the connectors is symmetrical. Thus, if a connector is rotated by 180° the lines for driving the LEDs are exchanged, and the controller can however drive the LEDs 24, 34. If the connector is rotated, the signaling lines are interchanged, which can be corrected by the crossover switches 12, 14. If the communication between the controller 18 and one of the memories 28, 38 fails, the controller 18 activates the crossover switch 12, 14 between the controller 18 and the memory 28, 38. Thereby, a possible signaling line mismatch is resolved and information can be exchanged between the controller and the memory 28, 38.

Figure 2:
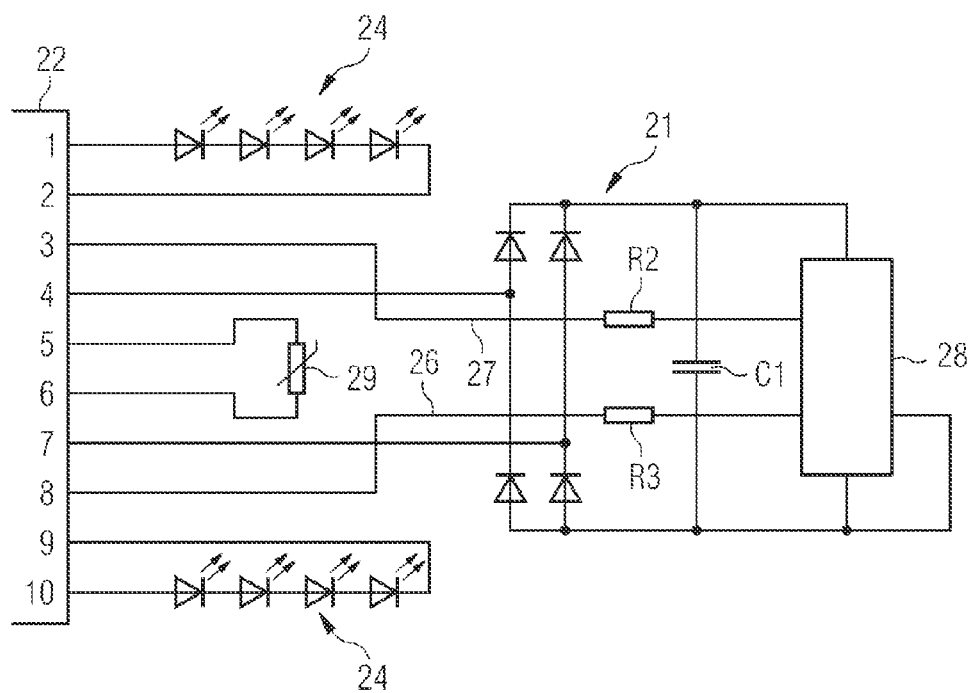
FIG. 2 shows a circuit diagram of a LED-module.

In FIG. 2 the LED-module 20 is depicted with some additional details: A NTC 29 is provided for measuring the LEDs 24 temperature. The two connectors of the NTC 29 are symmetrically under a rotation of the plug, thus the NTC 29 connects in any case with well-defined connectors of the controller on the printed-circuit board 10. Further the power supply for the memory 28 is as well depicted. Power can be supplied via the symmetrically positioned pins 3 and 8 of the connector part 22 which are connected with the input side of a rectifier 21. The output side of the rectifier 21 is connected to the memory 28.

The LEDs 24 comprise each a series of LEDs. A first series of LEDs is connected to pins 1 and 2 of the connector 22. A second series of LEDs is connected to pins 9 and 10. The pins for connection of the first series are positioned symmetrically to the pins for connecting the second series of LEDs 24. The pin assignment for the signaling lines 27, 28 follows the same scheme. Briefly summarizing the pin assignment of the connector is symmetrical under a rotation of 180°. Thus the ribbon cable can in any case connect the component 10 with the LED-module 20 such that a twisted ribbon cable is avoided. All lines of the ribbon cable except the signaling lines will be connected correctly. A possible mismatch of the signaling lines can be corrected by the crossover switch 12. Although it is preferred to use ribbon cable other types of cable be used as well.

Figure 3:
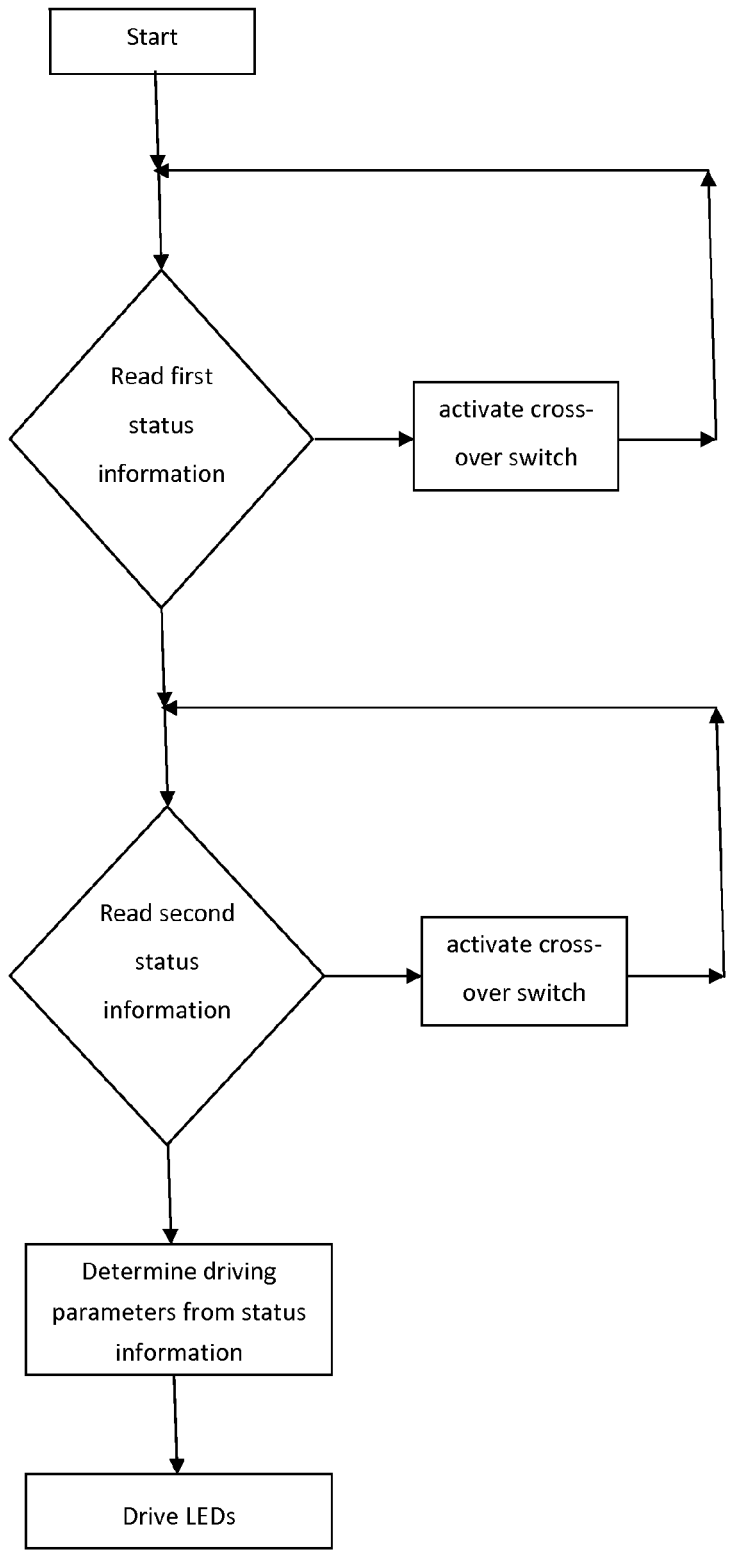
FIG. 3 shows a block diagram of a method for operating an airfield light.

The method for operating the airfield light is depicted in FIG. 3: The controller 18 attempts to read status information about the first LED-module (referred to as first status information) from the first memory 28. In case the reading fails, the controller 18 controls the crossover switch 12 to interchange the signaling lines 26, 27 and reads the status information from the first memory 28. Subsequently the controller 18 attempts to read status information about the second LED-module (referred to as second status information) from the second memory 38. In case the reading fails, the controller 18 controls the crossover switch 14 to interchange the signaling lines 36, 37 and reads the status information from the second memory 28. The controller evaluates the first and second status information to identify the LED-module with the LED emitting the lower luminosity. The status information comprises a value of use and a luminance of the LEDs under given conditions. The status information permits to obtain a characteristic of the respective LEDs. Based on these respective characteristics the first and second LEDs are driven such that they emit at least substantially an equal luminosity.

The invention and the method are explained in the context of airfield lighting. The invention can of course be used for light with at least two lighting modules that are controlled by a common controller.

It will be appreciated to those skilled in the art having the benefit of this disclosure that this invention is believed to provide enhanced LED airfield lights, like runway lights or taxi-way lights. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 compound/printed-circuit board
12 crossover switch
13 connector
14 crossover switch
18 controller
20 LED-module
21 rectifier
22 connector
24 LEDs
26 signaling line
27 signaling line
28 memory
29 temperature sensor
30 LED-module
32 connector
34 LEDs
36 signaling line
37 signaling line
38 memory
50 cable
52 connector
53 connector
40 ribbon cable
42 connector
43 connector

The invention claimed is:

1. A light-emitting diode (LED)-airfield light at least comprising:
   a printed-circuit board with at least one controller;
   a first LED-module with at least one first LED;
   a second LED-module with at least one second LED;
   a first cable connecting the printed circuit board with the first LED-module and a second cable connecting the printed circuit board with the second LED-module;
   wherein the first and second LED-modules each comprises a memory for storing status information about the respective first and second LEDs;
   wherein the controller is configured to read the status information from the each memory and to drive the at least one first LED via the first cable and the at least one second LED via the second cable in accordance with the status information;
   wherein the first and second cables each has at least one connector for connecting the cable with at least one of the printed-circuit board and the corresponding one of the first and second LED-modules;
   wherein the first and second cables each comprises at least a first signaling line and a second signaling line for connecting the respective memory with the printed-circuit board, the first and second signaling lines being arranged symmetrically under a rotation of the connector; and
   wherein the controller is configured to establish communication with at least one of the memories, and when communication fails, resolving a signaling line mismatch by permuting the respective first and second singling lines and re-establishing a communication with the at least one of the memories.

2. The LED-airfield light of claim 1, characterized in that the first and second LED-modules each comprises a printed-circuit board with a sheet metal layer.

3. The LED-airfield light of claim 2, characterized in that a sensor element is disposed on the sheet metal layer of each of one first and second LED-modules, each sensor element configured to measure the temperature of the respective at least one LED.

4. The LED-airfield light of claim 1, characterized in that a sensor element is disposed on the printed-circuit board of each of the first and second LED-modules, each sensor element configured to measuring the temperature of the respective at least one LED.

5. The LED-airfield light one of claim 1, characterized in that the at least one memory is non volatile.

6. A method for driving a light-emitting diode (LED)-airfield light by a controller connected to each of at least two LED-modules by at least two signaling lines, wherein the at least two LED-modules each comprises a memory, the method comprising:
   storing status information about at least one LED of each LED-module in the memory of the respective LED-module,
   attempting to establishing communication between the controller and at least one of the memories via the respective at least two signaling lines and, if communication fails, permuting the respective signaling lines and again attempting to establish communication between the controller via the respective at least two signaling lines and the at least one of the memories,
   reading the status information from the at least one of the memories by the controller,
   determining driving parameters for a first one of the LED-modules, considering the status information about at least a second one of the at least two LED modules.

7. The method of claim 6, characterized in that the status information comprises at least two values of selected from the group consisting of: an emitted luminosity, a current, a voltage and, a temperature.

8. The Method of claim 6, characterized in that the status information comprises at least one value of use representing the degeneration of the respective LED due to its use.

9. The method of claim 8, characterized in that the value of use comprises the power on time count of the LED on the respective LED-module.

10. The method of claim 7, characterized in that the value of use $v_u$ is defined as a function of $\int_{t_0}^{t} f(T(t'))dt'$, wherein $T(t')$ is the temperature of the respective LED or LED-module measured at some time $t'$ and $f(T(t'))$ is a weighting function.

* * * * *